United States Patent
Kim et al.

(10) Patent No.: US 9,886,132 B2
(45) Date of Patent: Feb. 6, 2018

(54) TOUCH PANEL AND CORRECTION METHOD THEREOF

(71) Applicant: Samsung Display Co., Ltd, Yongin-si, Gyeonggi-do (KR)

(72) Inventors: Jeong Kyoo Kim, Suwon-si (KR); Kyung Youl Min, Hwaseong-si (KR); Choong Sun Shin, Yongin-si (KR)

(73) Assignee: Samsung Display Co., Ltd. (KR)

( * ) Notice: Subject to any disclaimer, the term of this patent is extended or adjusted under 35 U.S.C. 154(b) by 30 days.

(21) Appl. No.: 15/059,886

(22) Filed: Mar. 3, 2016

(65) Prior Publication Data

US 2016/0334930 A1  Nov. 17, 2016

(30) Foreign Application Priority Data

May 12, 2015 (KR) .................. 10-2015-0066303

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01)

(58) Field of Classification Search
CPC ....... G06F 3/041–3/0418; G06F 3/044–3/047; G06F 2203/04103
See application file for complete search history.

(56) References Cited

U.S. PATENT DOCUMENTS

| | | | |
|---|---|---|---|
| 8,300,019 B2 * | 10/2012 | Elias | G06F 3/0418 178/18.06 |
| 9,454,278 B2 * | 9/2016 | Keppel | G06F 3/0418 |
| 2010/0309162 A1 * | 12/2010 | Nakanishi | G06F 3/044 345/174 |
| 2014/0015774 A1 * | 1/2014 | Bussat | G06F 3/0418 345/173 |
| 2014/0160086 A1 * | 6/2014 | Lee | G06F 3/0418 345/178 |
| 2015/0261357 A1 * | 9/2015 | Liu | G06F 3/0418 345/174 |

FOREIGN PATENT DOCUMENTS

| | | |
|---|---|---|
| JP | 2013-229010 A | 11/2013 |
| KR | 10-2010-0091416 A | 8/2010 |
| KR | 10-2011-0015745 A | 2/2011 |
| KR | 10-2011-0087003 A | 8/2011 |
| KR | 10-2014-0120619 A | 10/2014 |

\* cited by examiner

*Primary Examiner* — Gene W Lee
(74) *Attorney, Agent, or Firm* — Innovation Counsel LLP

(57) ABSTRACT

There is provided a touch panel, including: a plurality of sensing electrodes divided into a plurality of sensing electrode groups; and a plurality of touch detection circuits correspondingly connected to the plurality of sensing electrode groups, respectively, wherein the first touch detection circuit includes a first touch detection circuit unit outputting a first output value depending on a test voltage and the second touch detection circuit includes a second touch detection circuit unit outputting a second output value depending on the test voltage, the second touch detection circuit is adjacent to the first touch detection circuit, and the second output value is corrected to reduce a difference between the first output value and the second output value.

13 Claims, 3 Drawing Sheets

FIG. 3

|  | ADC_18 | ADC_19 | ADC_20 | ADC_21 | ADC_22 | ADC_23 |
|---|---|---|---|---|---|---|
| PRE-CORRECTION ADC OUTPUT | 205 | 201 | 204 | 155 | 156 | 153 |
| POST-CORRECTION ADC OUTPUT | 205 | 201 | 204 | 199.1 | 192 | 189.4 |

TOUCH PANEL AND CORRECTION METHOD THEREOF

RELATED APPLICATIONS

This application claims priority to and the benefit of Korean Patent Application No. 10-2015-0066303 filed in the Korean Intellectual Property Office on May 12, 2015, the entire contents of which are incorporated herein by reference.

BACKGROUND

1. Technical Field

The described technology relates generally to a touch panel, and more particularly, to a touch panel including a plurality of touch detection circuits.

2. Description of the Related Art

A touch screen panel is attached to a display panel to sense a user's touch. The touch screen panel may be integrally formed with the display panel and may also be formed in an in-cell type or an on-cell type.

When the user touches the touch panel, a capacitance is formed between a sensing electrode and a user's finger and thus a voltage quantity detected by a touch screen panel chip is changed. The touch panel discriminates whether the user touches the touch screen panel depending on the change in the voltage quantity. The capacitance type is classified into a self-capacitance type and a mutual-capacitance type.

The touch screen panel may include a plurality of touch screen panel chips to accommodate a large area. However, even though the plurality of touch screen panel chips are produced by the same process, they may have different touch sensitivities.

That is, even though the user's touch is input at a predetermined strength, different output values may be output. Therefore, when the user draws a continuous line by using a stylus pen, etc., a display may be less smooth at a boundary region between two adjacent touch screen panel chips due to discontinuous touch sensitivity.

Therefore, a need exists for a touch panel capable of providing continuous touch sensitivity even when a plurality of touch screen panel chips is used.

The above information disclosed in this Background section is only for enhancement of understanding of the background of the described technology and therefore it may contain information that does not form the prior art that is already known in this country to a person of ordinary skill in the art.

SUMMARY

The described technology provides a touch panel and a correction method thereof having advantages of providing continuous touch sensitivity at a boundary region between two adjacent touch screen panel chips.

An exemplary embodiment provides a touch panel, including: a plurality of sensing electrodes divided into a plurality of sensing electrode groups; and a plurality of touch detection circuits correspondingly connected to the plurality of sensing electrode groups, respectively, wherein the first touch detection circuit includes a first touch detection circuit unit outputting a first output value depending on a test voltage and the second touch detection circuit includes a second touch detection circuit unit outputting a second output value depending on the test voltage, the second touch detection circuit is adjacent to the first touch detection circuit, and the second output value is corrected to reduce a difference between the first output value and the second output value.

The touch panel may further include: at least one analog-digital converter (ADC) outputting the first output value and the second output value; and a digital processing unit applying a weight value to at least one of the first output value and the second output value to generate a second corrected output value.

The second corrected output value may be a summed value of a first weighted output value obtained by applying a first weight value to the first output value and a second weighted output value obtained by applying a second weight value to the second output value.

The first touch detection circuit may include A first touch detection circuit units, the second touch detection circuit may include B second touch detection circuit units, C first touch detection circuit units adjacent to the second touch detection circuit may be applied with different first weight values, C second touch detection circuit units adjacent to the first touch detection circuit may be applied with different second weight values, and the C may be a natural number smaller than the A and the B.

The second output value of the second touch detection circuit unit, not the C second touch detection circuit units, among the B second touch detection circuit units may be maintained without being corrected.

When an average value of the plurality of second output values is smaller than an average value of the plurality of first output values, the closer each of the C first touch detection circuit units is to the adjacent second touch detection circuit, the larger its first weight value may be, and the closer each of the C second touch detection circuit units is to the adjacent first touch detection circuit, the smaller its second weight value may be.

When the average value of the plurality of second output values is larger than an average value of the plurality of first output values, the closer each of the C first touch detection circuit units is to the adjacent second touch detection circuit, the smaller its first weight value may be, and the closer each of the C second touch detection circuit units is to the adjacent first touch detection circuit, the larger its second weight value may be.

The first touch detection circuit unit corresponding to the first weight value used in calculating the second corrected output value and the second touch detection circuit unit corresponding to the second weight value used in calculating the second corrected output value may be selected one-to-one, corresponding to a distance from a boundary between the first touch detection circuit and the second touch detection circuit.

A sum of the first weight value and the second weight value selected corresponding to the first weight value may be 1.

The second touch detection circuit unit may include at least two capacitors and the second output value may be corrected by controlling a ratio of capacitance values of the at least two capacitors.

The first touch detection circuit may include the plurality of first touch detection circuit units, the second touch detection circuit may include the plurality of second touch detection circuit units, and as at least some of the second touch detection circuit units are adjacent to the first touch detection circuits, the second output value may be linearly corrected to approximate the first output value.

Another embodiment provides a correction method of a touch panel including a plurality of touch detection circuits connected to different sensing electrode groups and a plurality of touch detection circuit units in which the plurality of touch detection circuits are each connected to different sensing electrodes, the correction method including: applying a test voltage to a plurality of sensing electrodes; generating, by the plurality of touch detection circuit units, a plurality of output values; and correcting a plurality of second output values to reduce a difference between a plurality of first output values of the first touch detection circuit and a plurality of second output values of the second touch detection circuit, wherein the first touch detection circuit and the second touch detection circuit are adjacent to each other.

The first touch detection circuit may include A first touch detection circuit units and the second touch detection circuit may include B second touch detection circuit units, wherein correcting the plurality of second output values may include: generating a plurality of first weight output values by assigning different first weight values to a plurality of first output values of C first touch detection circuit units adjacent to the second touch detection circuit generating a plurality of second weight output values by assigning different second weight values to a plurality of second output values of the C second touch detection circuit units adjacent to the first touch detection circuit generating a plurality of second corrected output values by summing the first weight output values and the second weight output values which correspond to each other, and the C may be a natural number smaller than the A and the B.

The first weight output value and the second weight output value which correspond to each other may each be a value calculated from the first output value and the second output value of the first touch detection circuit unit and the second touch detection circuit unit wherein the first touch detection circuit unit and the second touch detection circuit unit are selected one-to-one, corresponding to a distance from a boundary between the first touch detection circuit and the second touch detection circuit.

The different first weight values may be linearly reduced in a first direction and the different second weight values may be linearly increased in the first direction.

The different first weight values may be linearly increased in a first direction and the different second weight values may be linearly reduced in the first direction.

According to an exemplary embodiment, it is possible to provide the touch panel and the correction method thereof capable of providing continuous touch sensitivity at the boundary region between the two adjacent touch screen panel chips.

BRIEF DESCRIPTION OF THE DRAWINGS

FIG. 3 is a diagram describing a correction method of a touch panel according to an exemplary embodiment.

DETAILED DESCRIPTION

Figure 1:
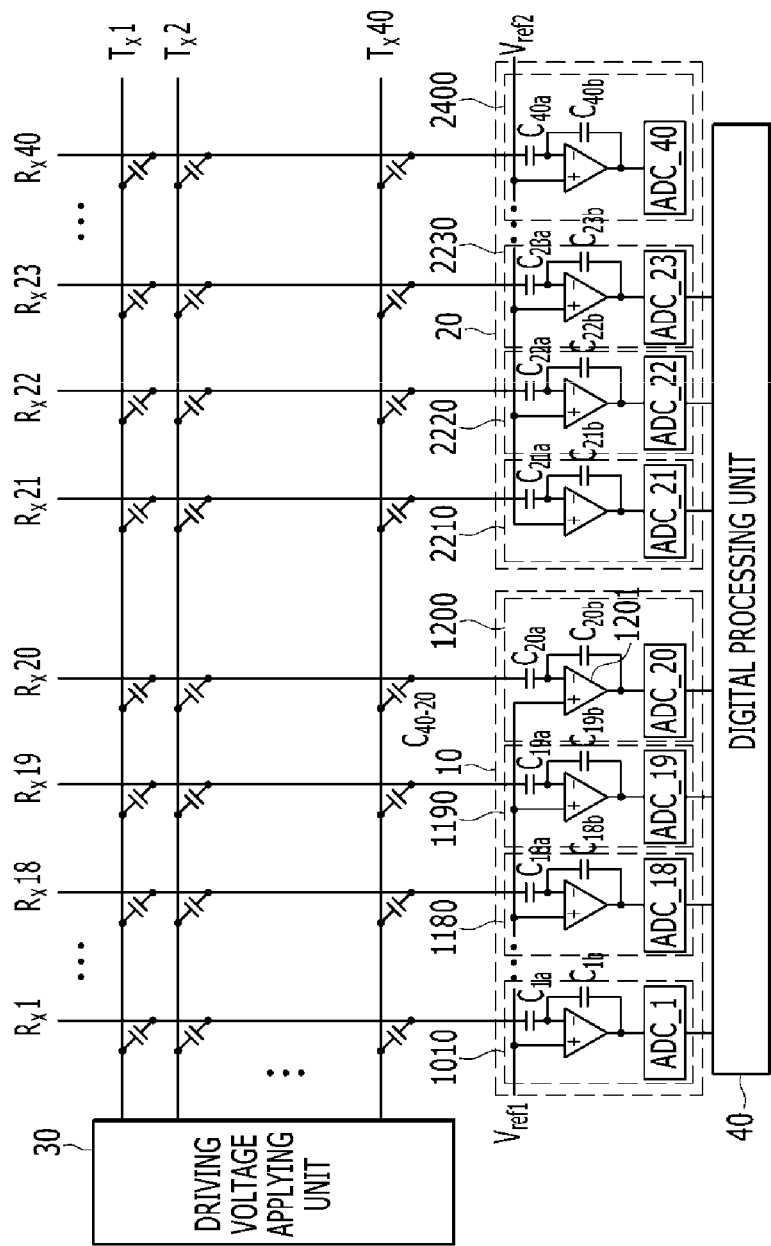
FIG. 1 is a diagram illustrating a touch panel according to an exemplary embodiment.

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising", will be understood to imply the inclusion of stated elements but not the exclusion of any other elements. In addition, throughout the specification, the word "on" does not necessarily mean that any element is positioned at an upper side based on a gravity direction, but means that any element is positioned above or below a target portion.

FIG. 1 is a diagram illustrating a touch panel according to an exemplary embodiment.

Referring to FIG. 1, a touch panel according to an exemplary embodiment includes a plurality of Tx electrodes Tx1 to Tx40, a plurality of Rx electrodes Rx1 to Rx40, a plurality of touch detection circuits 10 and 20, a driving voltage applying unit 30, and a digital processing unit 40.

FIG. 1 illustrates a mutual-capacitance type touch panel, but a correction method of the present disclosure may be identically applied to a self-capacitance type touch panel. That is, the self-capacitance type touch panel includes the plurality of touch detection circuits and when touch sensitivities of adjacent touch detection circuits are different, the correction method of the present disclosure may be identically applied.

The plurality of Tx electrodes Tx1 to Tx40 may be formed in a first direction and the plurality of Rx electrodes Rx1 to Rx40 may be formed in a second direction. The first direction and the second direction may be perpendicular to each other. The plurality of Tx electrodes Tx1 to Tx40 and the plurality of Rx electrodes Rx1 to Rx40 form mutual capacitance. As an example, a reference numeral is described in mutual capacitance C40-20 which is formed between the Tx electrode Tx40 and the Rx electrode Rx20. The number of Tx electrodes Tx1 to Tx40 and Rx electrodes Rx1 to Rx40 of FIG. 1 is exemplary and may vary according to a design of manufacturers.

In the mutual-capacitance type, the plurality of Tx electrodes Tx1 to Tx40 and the plurality of Rx electrodes Rx1 to Rx40 are collectively referred to as a plurality of sensing electrodes.

The plurality of touch detection circuits 10 and 20 mean a plurality of touch screen panel chips. The touch screen panel chip may be implemented as an integrated circuit (IC). An internal configuration of the touch detection circuits 10 and 20 may vary according to a kind of touch screen panel chips. For example, FIG. 1 illustrates that the touch detection circuits 10 and 20 include a plurality of analog-digital converters (ADCs) ADC_1 to ADC_40. However, the touch screen panel chip may be a pure analog chip. In this case, the ADC may also be a separate component which is not included in the touch screen panel chip. For example, only one ADC may be separately present and may be selectively connected to a plurality of touch detection circuit units through a multiplexer. That is, the number of ADCs and the positions of the ADCs may vary according to the design of manufacturers.

The plurality of touch detection circuits 10 and 20 are each connected to the corresponding sensing electrode group. In the mutual-capacitance type, the sensing electrode group means the group of the Rx electrodes Rx1 to Rx40. In FIG. 1, the first sensing electrode groups Rx1 to Rx20 are connected to the first touch detection circuit 10 and the second sensing electrode groups Rx21 to Rx40 are connected to the second touch detection circuit 20.

The plurality of touch detection circuits 10 and 20 may each include a plurality of touch detection circuit units 1010 to 1180, 1190, 1200, 2210, 2220, and 2230 to 2400. In FIG. 1, the first touch detection circuit 10 includes 20 first touch detection circuit units 1010 to 1180, 1190, and 1200 and the second touch detection circuit 20 includes 20 second touch detection circuit units 2210, 2220, and 2230 to 2400. Due to the limit of the space, FIG. 1 illustrates only the first touch detection circuit units 1010, 1180, 1190, and 1200, but the first touch detection circuit units 1020, 1030, 1040, 1050, 1060, 1070, 1080, 1090, 1100, 1110, 1120, 1130, 1140, 1150, 1160, and 1170 are also sequentially present. Further, due to the limit of the space, FIG. 1 illustrates only the second touch detection circuit units 2210, 2220, 2230, and 2400, but the second touch detection circuit units 2240, 2250, 2260, 2270, 2280, 2290, 2300, 2310, 2320, 2330, 2340, 2350, 2360, 2370, 2380, and 2390 are also sequentially present.

The number of touch detection circuit units 1010 to1180, 1190, 1200, 2210, 2220, and 2230 to 2400 which are included in each of the touch detection circuits 10 and 20 may vary according to a kind of touch detection circuits 10 and 20.

Each of the touch detection circuit units 1010 to 1180, 1190, 1200, 2210, 2220, and 2230 to 2400 is correspondingly connected to one of the Rx electrodes Rx1 to Rx40. A configuration of the touch detection circuit units 1010 to 1180, 1190, 1200, 2210, 2220, and 2230 to 2400 will be described in detail with reference to FIG. 2.

The first touch detection circuit 10 is supplied with a first reference voltage Vref1 and the second touch detection circuit 20 is supplied with a second reference voltage Vref2. The first reference voltage Vref1 and the second reference voltage Vref2 may be the same voltage. The reference voltages Vref1 and Vref2 may be connected to a non-inverting terminal of the corresponding amplifier.

The driving voltage applying unit 30 applies a touch driving voltage to a plurality of Tx electrodes Tx1 to Tx40. In this case, the touch driving voltage may be a test voltage for correcting the touch sensitivity of the touch panel. The driving voltage applying unit 30 may sequentially apply the test voltage from the Tx electrode Tx1 to the Tx electrode Tx40.

The touch detection circuit units 1010 to 1180, 1190, 1200, 2210, 2220, and 2230 to 2400 may generate the corresponding output values depending on the sequentially applied test voltage, and the digital processing unit 40 may receive a plurality of output values to recognize the touch sensitivity depending on the position. The output values of the first touch detection circuit units 1010 to 1180, 1190, and 1200 are called a first output value and the output values of the second touch detection circuit units 2210, 2220, and 2230 to 2400 are called a second output value.

Figure 2:
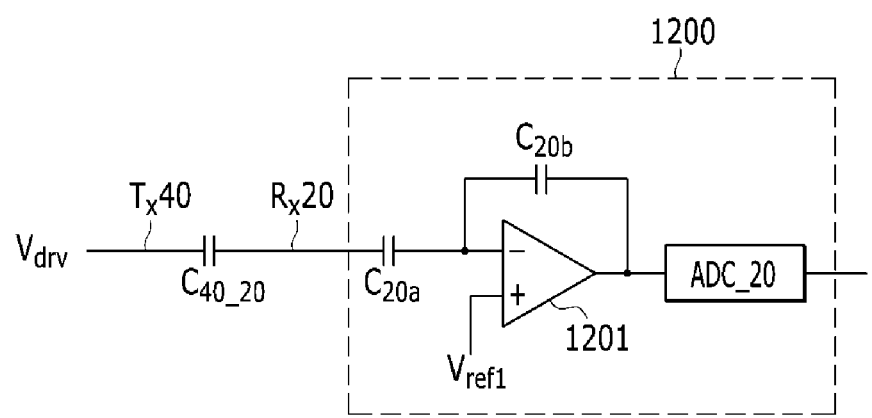
FIG. 2 is a diagram illustrating a touch detection circuit unit according to an exemplary embodiment.

FIG. 2 is a diagram illustrating a touch detection circuit unit according to an exemplary embodiment.

The first touch detection circuit unit 1200 includes capacitors C20a and C20b, amplifier 1201, and an ADC ADC_20, but the configuration may vary according to the configuration of the touch detection circuits 10 and 20 and the touch panel. As described above, each of the touch detection circuit units 1010 to 1180, 1190, 1200, 2210, 2220, and 2230 to 2400 may also be configured not to include the ADC.

The Tx electrode Tx40 and the Rx electrode Rx20 form a mutual capacitance C40_20. The driving voltage applying unit 30 applies a touch driving voltage Vdry through the Tx electrode Tx40. In correcting the touch panel, the touch driving voltage Vdry may be the test voltage.

One terminal of the first capacitor C20a of the touch detection circuit unit 1200 may be connected to the Rx electrode Rx20 and the other terminal of the first capacitor C20a may be connected to an inverting terminal of the amplifier 1201. One terminal of the second capacitor C20b may be connected to the inverting terminal of the amplifier 1201 and the other terminal of the second capacitor C20b may be connected to the output terminal of the amplifier 1201.

Resistance values of the Tx electrode Tx40, the Rx electrode Rx20, and the wiring and parasitic capacitance values formed between different conductive materials from the Tx electrode Tx40 and the Rx electrode Rx20 may be included in the circuit illustrated in FIG. 2, but may be omitted for simplification of explanation.

An output terminal voltage Vout of the amplifier 1201 may be described with the following Equation 1.

$$Vout = Vref1 - (Cs/C20b)*(Vdrv - Vref1) \quad \text{[Equation 1]}$$

In the above Equation 1, Cs is an equivalent capacitance corresponding to a serial sum of the capacitance of the first capacitor 20a and the mutual capacitance C40_20. Therefore, the output terminal voltage Vout of the amplifier 1201 may be controlled by adjusting the ratio of the capacitance values of the first capacitor 20a and the second capacitor 20b. At least one capacitance value of the first capacitor 20a and the second capacitor 20b may be controlled by trimming. For example, when the touch driving voltage Vdry is larger than the first reference voltage Vref1, the output terminal voltage Vout is increased with the increase in the value of the second capacitor 20b and the output terminal voltage Vout is reduced with the reduction in the value of the second capacitor 20b.

Therefore, some 2210, 2220, and 2230 of the second touch detection circuit units 2210, 2220, and 2230 to 2400 which are adjacent to the first touch detection circuit 10 may be linearly corrected so that the second output value approximates the first output value. For example, when the first output value of the first touch detection circuit unit 1200 is 200 and the second output value of the second touch detection circuit unit 2240 is 160, the correction may be performed so that the second output value of the second touch detection circuit unit 2210 is 190, the second output value of the second touch detection circuit unit 2220 is 180, and the second output value of the second touch detection circuit unit 2230 is 170. Therefore, the first output value of the first touch detection circuit unit 1200 and the second output value of the second touch detection circuit unit 2240 may be linearly corrected and continuous touch sensitivity may be provided to the user.

FIG. 3 is a diagram describing a correction method of a touch panel according to an exemplary embodiment. Hereinafter, the correction method of the touch panel according to the exemplary embodiment will be described with reference to FIGS. 1 to 3. However, the foregoing correction method according to the control of the capacitance value of the first capacitor 20a and the second capacitor 20b is not described but a correction method using a weight value by the digital processing unit 40 will be described with reference to FIG. 2.

When the test voltage is sequentially applied to the Tx electrodes Tx1 to Tx40 by the driving voltage applying unit 30, the first touch detection circuit units 1010 to 1180, 1190, and 1200 each output the first output value, and the second touch detection circuit units 2210, 2220, 2230 to 2400 each output the second output value. In this case, the plurality of first output values and the plurality of second output values are values which are not corrected.

The correction method of the touch panel according to the exemplary embodiment corrects the output value between the touch detection circuits adjacent to each other. The fact that the touch detection circuits are 'adjacent to each other' means that the two touch detection circuits form a boundary. In FIG. 1, the first touch detection circuit 10 and the second touch detection circuit 20 are adjacent to each other to form a boundary. That is, a space between the Rx electrode Rx20 which is a rightmost sensing electrode of the first touch detection circuit 10 and the Rx electrode Rx21 which is a leftmost sensing electrode of the second touch detection circuit 20 is the boundary between the first touch detection circuit 10 and the second touch detection circuit 20. If the touch sensitivity of at least one of the first touch detection circuit 10 and the second touch detection circuit 20 is not corrected, when the user performs a touch by crossing the boundary, there is a problem in that he/she recognizes the difference in the touch sensitivity.

Therefore, as described below, at least one of the first output value and the second output value is corrected to reduce the difference between the first output value and the second output value. The correction method of the second output value will be described below but the first output value may be corrected by the same method.

The ADC ADC_1 to ADC40 outputs the plurality of first output values and the plurality of second output values. The digital processing unit 40 receives the plurality of first output values and the plurality of second output values. The digital processing unit 40 applies the weight value to the plurality of first output values and the plurality of second output values to generate the second corrected output value instead of the second output value. A digital stage below the digital processing unit 40 uses the second corrected output value as the output value of the second touch detection circuit 20.

As one exemplary embodiment, the second corrected output value may be calculated by the following Equation 2. The calculation by the following Equation 2 will be described below.

Second corrected output value=(first output value*first weight value)+(second output value*second weight value) [Equation 2]

In this case, the sum of the first weight value and the second weight value may be 1. A factor (first output value*first weight value) applying the first weight value to the first output value may be called the first weight output value. A factor (second output value*second weight value) applying the second weight value to the second output value may be called the second weight output value.

The first touch detection circuit 10 may include A first touch detection circuit units 1010 to 1180, 1190, and 1200. For example, referring to FIG. 1, A is 20.

The second touch detection circuit 20 may include B second touch detection circuit units 2210, 2220, and 2230 to 2400. For example, referring to FIG. 1, B is 20.

C first touch detection circuit units 1120, 1130, 1140, 1150, 1160, 1170, 1180, 1190, and 1200 adjacent to the second touch detection circuit 20 may be assigned with different first weight values and C second touch detection circuit units 2210, 2220, 2230, 2240, 2250, 2260, 2270, 2280, and 2290 adjacent to the first touch detection circuit 10 may be assigned with different second weight values. In this case, the C is a natural number smaller than the A and the B and in the present exemplary embodiment, the C is 9.

The second output values of the second touch detection circuit units 2300, 2310, 2320, 2330, 2340, 2350, 2360, 2370, 2380, 2390, and 2400, not the C second touch detection circuit units 2210, 2220, 2230, 2240, 2250, 2260, 2270, 2280, and 2290, among the B second touch detection circuit units 2210, 2220, and 2230 to 2400 may be maintained without being corrected.

That is, a design may be made to correct only the second touch detection circuit units 2210, 2220, 2230, 2240, 2250, 2260, 2270, 2280, and 2290 adjacent to the boundary between the first touch detection circuit 10 and the second touch detection circuit 20. However, as the number of second touch detection circuit units to be corrected is increased, that is, as the C value is increased, the user may experience continuous touch sensitivity.

When an average value of the plurality of second output values is smaller than an average value of the plurality of first output values, the closer each of the C first touch detection circuit units 1120, 1130, 1140, 1150, 1160, 1170, 1180, 1190, and 1200 is to the adjacent second touch detection circuit 20, the larger its first weight value may be, and the closer each of the C second touch detection circuit units 2210, 2220, 2230, 2240, 2250, 2260, 2270, 2280, 2290 is to the adjacent first touch detection circuit 10, the smaller its second weight value may be.

Due to the limit of the space, FIG. 3 illustrates a pre-correction ADC output value including three first output values and three second output values and a post-correction ADC output value including three first output value and three second output values. As described above, only the second output value is corrected.

Before the correction is performed, the first output value of the first touch detection circuit unit 1180 is 205, the first output value of the first touch detection circuit unit 1190 is 201, and the first output value of the first touch detection circuit unit 1200 is 204. The output value of the ADC may vary depending on how many bits the ADC supports and a bit range to be used. Although not illustrated, it is assumed that all the first output values of the first touch detection circuit units 1010 to 1170 are the same, with a value of 202.

Before the correction is performed, the second output value of the first touch detection circuit unit 2210 is 155, the second output value of the second touch detection circuit unit 2220 is 156, and the second output value of the second touch detection circuit unit 2230 is 153. Although not illustrated, it is assumed that all the second output values of the second touch detection circuit units 2240 to 2400 are the same value of 154.

Therefore, an average value of the plurality of first output values is 202.2 and an average value of the plurality of second output values is 154.1. Therefore, the average value of the plurality of second output values may be smaller than that of the plurality of first output values. According to the exemplary embodiment, the average value is obtained by averaging the output values of all the touch detection circuit units of each of the touch detection circuits 10 and 20, but only the output value of some of the touch detection circuit units may be averaged.

For each of the C first touch detection circuit units 1120, 1130, 1140, 1150, 1160, 1170, 1180, 1190, and 1200, the closer each first touch detection unit is to the adjacent second touch detection circuit 20, the larger its first weight value may be. Therefore, in the first touch detection circuit unit

1180, the first weight value may be set to be 0.7, in the first touch detection circuit unit 1190, the first weight value may be set to be 0.8, and in the first touch detection circuit unit 1200, the first weight value may be set to be 0.9. In the first touch detection circuit units 1120, 1130, 1140, 1150, 1160, and 1170, the first weight values may each be set to be 0.1, 0.2, 0.3, 0.4, 0.5, and 0.6, respectively.

For each of the C second touch detection circuit units 2210, 2220, 2230, 2240, 2250, 2260, 2270, 2280, and 2290, the closer each second touch detection unit is to the adjacent first touch detection circuit 10, the smaller its second weight value may be. Therefore, in the second touch detection circuit unit 2210, the second weight value may be set to be 0.1, in the second touch detection circuit unit 2220, the second weight value may be set to be 0.2, and in the second touch detection circuit unit 2230, the second weight value may be set to be 0.3. In the second touch detection circuit units 2240, 2250, 2260, 2270, 2280, and 2290, the second weight values may each be set to be 0.4, 0.5, 0.6, 0.7, 0.8, and 0.9, respectively.

According to another exemplary embodiment, when the average value of the plurality of second output values is larger than that of the plurality of first output values, the closer each of the C first touch detection circuit units 1120, 1130, 1140, 1150, 1160, 1170, 1180, 1190, and 1200 is to the adjacent second touch detection circuit 20, the smaller its first weight value may be, and the closer each of the C second touch detection circuit units 2210, 2220, 2230, 2240, 2250, 2260, 2270, 2280, 2290 is to the adjacent first touch detection circuit 10, the larger its second weight value may be. The detailed description thereof will be omitted.

The first touch detection circuit units 1120, 1130, 1140, 1150, 1160, 1170, 1180, 1190, and 1200 corresponding to the first weight value used in calculating the second corrected output value of Equation 2 and the second touch detection circuit units 2210, 2220, 2230, 2240, 2250, 2260, 2270, 2280, and 2290 corresponding to the second weight value may be selected one-to-one, corresponding to the distance from the boundary between the first touch detection circuit 10 and the second touch detection circuit 20.

For example, the first touch detection circuit unit 1200 and the second touch detection circuit unit 2210 having the closest distance from the boundary may be selected one-to-one. Therefore, the second corrected output value of the second touch detection circuit unit 2210 is calculated as (204*0.9)+(155*0.1) based on Equation 2 and thus becomes 199.1. Therefore, the digital processing unit 40 replaces the value 155, which is the pre-correction second output value of the second touch detection circuit unit 2210, with 199.1 which is the post-correction second output value. The digital stage of the digital processing unit 40 recognizes the second output value of the second touch detection circuit unit 2210 as 199.1 and processes the second output value.

The first touch detection circuit unit 1190 and the second touch detection circuit unit 2220 having the second closest distance from the boundary may be selected one-to-one. Therefore, the second corrected output value of the second touch detection circuit unit 2220 is calculated as (201*0.8)+(156*0.2) based on Equation 2 and thus becomes 192. Therefore, the digital processing unit 40 replaces the value 156, which is the pre-correction second output value of the second touch detection circuit unit 2220, with 192 which is the post-correction second output value. The digital stage of the digital processing unit 40 recognizes the second output value of the second touch detection circuit unit 2220 as 192 and processes the second output value.

Similarly, the first touch detection circuit unit 1180 and the second touch detection circuit unit 2230 having the third closest distance from the boundary may be selected one-to-one. Therefore, the second corrected output value of the second touch detection circuit unit 2230 is calculated as (205*0.7)+(153*0.3) based on Equation 2 and thus becomes 189.4. Therefore, the digital processing unit 40 replaces the value 153, which is the pre-correction second output value of the second touch detection circuit unit 2230, with 189.4 which is the post-correction second output value. The digital stage of the digital processing unit 40 recognizes the second output value of the second touch detection circuit unit 2230 as 189.4 and processes the second output value.

On the same principle, although not illustrated in FIG. 3, the second corrected output value of the second touch detection circuit unit 2240 is calculated as (202*0.6)+(154*0.4) and thus is 182.8, the second corrected output value of the second touch detection circuit unit 2250 is calculated as (202*0.5)+(154*0.5) and thus is 178, the second corrected output value of the second touch detection circuit unit 2260 is calculated as (202*0.4)+(154*0.6) and is 173.2, the second corrected output value of the second touch detection circuit unit 2270 is calculated as (202*0.3)+(154*0.7) and thus is 168. 4, the second corrected output value of the second touch detection circuit unit 2280 is calculated as (202*0.2)+(154*0.8) and thus is 163.6, and the second corrected output value of the second touch detection circuit unit 2290 is calculated as (202*0.1)+(154*0.9) and thus is 158.8.

The second output values of the second touch detection circuit units 2300, 2310, 2320, 2330, 2340, 2350, 2360, 2370, 2380, 2390, and 2400 which are not corrected as described above are 154.

Therefore, in the boundary area, before the correction, the difference between the first output value of the first touch detection circuit unit 1200 and the second output value of the second touch detection circuit unit 2210 is 49 but after the correction, the difference is reduced to 4.9. Further, the difference in the second output values is maintained at 3 to 7 even between the adjacent second touch detection circuit units, which is not recognized as the sudden change in touch sensitivity by the user.

The accompanying drawings and the detailed description of the present disclosure which are referred until now are only an example of the present disclosure, and are only used to describe the present disclosure but are not used to limit the meaning or the scope of the present disclosure described in the appended claims. Therefore, it will be appreciated to those skilled in the art that various modifications are made and other equivalent embodiments are available. Accordingly, the actual technical protection scope of the present disclosure must be determined by the technical spirit of the appended claims.

DESCRIPTION OF SYMBOLS

10: First touch detection circuit
20: Second touch detection circuit
30: Driving voltage applying unit
40: Digital processing unit
1010 to 1180, 1190, 1200: First touch detection circuit unit
2210, 2220, 2230 to 2400: Second touch detection circuit unit

What is claimed is:

1. A touch panel, comprising:
    a plurality of sensing electrodes divided into a plurality of sensing electrode groups; and
    a plurality of touch detection circuits correspondingly connected to the plurality of sensing electrode groups, respectively,
    at least one analog-digital converter (ADC) outputting a first output value and a second output value,
    a digital processing unit applying a weight value to at least one of the first output value and the second output value to generate a second corrected output value
    wherein a first touch detection circuit includes a first touch detection circuit unit outputting the first output value depending on a test voltage and a second touch detection circuit includes a second touch detection circuit unit outputting the second output value depending on the test voltage,
    the second touch detection circuit is adjacent to the first touch detection circuit, and
    the second output value is corrected to reduce a difference between the first output value and the second output value
    the second corrected output value is a summed value of a first weighted output value obtained by applying a first weight value to the first output value and a second weighted output value obtained by applying a second weight value to the second output value.

2. The touch panel of claim 1, wherein: the first touch detection circuit includes A first touch detection circuit units, the second touch detection circuit includes B second touch detection circuit units, C first touch detection circuit units adjacent to the second touch detection circuit are applied with different first weight values, C second touch detection circuit units adjacent to the first touch detection circuit are applied with different second weight values, and the C is a natural number smaller than the A and the B.

3. The touch panel of claim 2, wherein:
    the second output value of the second touch detection circuit unit, not the C second touch detection circuit units, among the B second touch detection circuit units is maintained without being corrected.

4. The touch panel of claim 3, wherein:
    when an average value of a plurality of second output values is smaller than an average value of a plurality of first output values,
    the closer each of the C first touch detection circuit units is to the adjacent second touch detection circuit, the larger its first weight value, and
    the closer each of the C second touch detection circuit units is to the adjacent first touch detection circuit, the smaller its second weight value.

5. The touch panel of claim 3, wherein:
    when an average value of a plurality of second output values is larger than that of a plurality of first output values,
    the closer each of the C first touch detection circuit units is to the second touch detection circuit, the smaller its first weight value, and
    the closer each of the C second touch detection circuit units is to the first touch detection circuit, the larger its second weight value.

6. The touch panel of claim 4, wherein:
    the first touch detection circuit unit corresponding to the first weight value used in calculating the second corrected output value and the second touch detection circuit unit corresponding to the second weight value used in calculating the second corrected output value are selected one-to-one, corresponding to a distance from a boundary between the first touch detection circuit and the second touch detection circuit.

7. The touch panel of claim 6, wherein:
    a sum of the first weight value and the second weight value selected corresponding to the first weight value is 1.

8. The touch panel of claim 1, wherein:
    the second touch detection circuit unit includes at least two capacitors, and
    the second output value is corrected by controlling a ratio of capacitance values of the at least two capacitors.

9. The touch panel of claim 8, wherein:
    the first touch detection circuit includes a plurality of first touch detection circuit units,
    the second touch detection circuit includes a plurality of second touch detection circuit units, and
    as at least some of the second touch detection circuit units are adjacent to the first touch detection circuits, the second output value is linearly corrected to approximate the first output value.

10. A correction method of a touch panel including a plurality of touch detection circuits connected to different sensing electrode groups and a plurality of touch detection circuit units in which the plurality of touch detection circuits are each connected to different sensing electrodes, the correction method comprising:
    applying a test voltage to a plurality of sensing electrodes;
    generating, by the plurality of touch detection circuit units, a plurality of output values; and
    correcting a plurality of second output values to reduce a difference between a plurality of first output values of a first touch detection circuit and the plurality of second output values of a second touch detection circuit, wherein the first and second touch detection circuits are adjacent to each other
    the first touch detection circuit includes A first touch detection circuit units, and
    the second touch detection circuit includes B second touch detection circuit units, and
    the correcting of the plurality of second output values includes:
    generating a plurality of first weight output values by assigning different first weight values to a plurality of first output values of C first touch detection circuit units adjacent to the second touch detection circuit;
    generating a plurality of second weight output values by assigning different second weight values to a plurality of second output values of C second touch detection circuit units adjacent to the first touch detection circuit;
    generating a plurality of second corrected output values by summing the first weight output value and the second weight output value which correspond to each other, and
    the C is a natural number smaller than the A and the B.

11. The correction method of claim 10, wherein:
    the first weight output value and the second weight output value which correspond to each other are each a value calculated from the first output value and the second output value of the first touch detection circuit unit and the second touch detection circuit unit wherein the first touch detection circuit unit and the second touch detection circuit unit are selected one-to-one, corresponding to a distance from a boundary between the first touch detection circuit and the second touch detection circuit.

12. The correction method of claim 10, wherein: the different first weight values are linearly reduced in a first direction, and the different second weight values are linearly increased in the first direction.

13. The correction method of claim 10, wherein: the different first weight values are linearly increased in a first direction, and the different second weight values are linearly reduced in the first direction.

* * * * *